(12) United States Patent
Wolf et al.

(10) Patent No.: US 8,491,787 B2
(45) Date of Patent: Jul. 23, 2013

(54) LEVELING HOLD-DOWN MECHANISM FOR LATERAL SCREENS

(75) Inventors: Timothy Wolf, Andover, MN (US); Garth Saul, Faribault, MN (US); Michael Ekholm, Minneapolis, MN (US); Ehrich Shaw, Coon Rapids, MN (US); Frederick Granet, Marigny Brizay (FR); Fabrice Courageot, Saint Georges les Baillargeaux (FR); John Schwert, Minneapolis, MN (US)

(73) Assignee: Johnson Screens, Inc., Houston, TX (US)

( * ) Notice: Subject to any disclaimer, the term of this patent is extended or adjusted under 35 U.S.C. 154(b) by 21 days.

(21) Appl. No.: 13/157,043

(22) Filed: Jun. 9, 2011

(65) Prior Publication Data

US 2012/0312728 A1  Dec. 13, 2012

(51) Int. Cl.
*B01D 24/24* (2006.01)
*B01D 24/38* (2006.01)

(52) U.S. Cl.
USPC ............ 210/232; 210/289; 210/291; 210/293

(58) Field of Classification Search
USPC .................................. 210/232, 289, 291, 293
See application file for complete search history.

(56) References Cited

U.S. PATENT DOCUMENTS

| | | | | |
|---|---|---|---|---|
| 980,442 | A * | 1/1911 | Schlafly | 405/48 |
| 1,071,185 | A * | 8/1913 | Shannon | 285/405 |
| 2,528,065 | A | 10/1950 | Lundberg | |
| 2,873,857 | A * | 2/1959 | Scheid | 210/293 |
| 4,096,911 | A | 6/1978 | Geske | |
| 4,331,542 | A * | 5/1982 | Emrie | 210/794 |
| 5,156,738 | A | 10/1992 | Maxson | |
| 5,618,426 | A | 4/1997 | Eischen et al. | |
| 6,691,413 | B2 * | 2/2004 | Haggard | 29/896.62 |
| 6,797,166 | B1 | 9/2004 | Hambly | |
| 8,052,870 | B2 * | 11/2011 | Roberts et al. | 210/232 |

OTHER PUBLICATIONS

Johnson Screens, "Triton Underdrain Systems," obtained from www.johnsonscreens.com, (c) 2008.
Johnson Screens, "Triton Underdrain Systems. No Gravel. No Hassle.," obtained from www.johnsonscreens.com, JS-BR5211-0702, (c) 2002.
"Report Fotografico—Bastia," obtained from http://www.finderpumps.com/public/prodotti/pdf/triton%20referenza%20bastia.pdf, undated.
ASCO Pompe S.R.L., Brochure entitled "drenaggio filtri a sabbia sistema triton," obtained from www.ascowater.com, undated.
ASCO Pompe S.R.L., Brochure entitled "Sistemi di drenaggio per filtri a sabbia Triton (R), " obtained from www.ascowater.com, undated.
Search Report in counterpart European Appl. 12 171 359.8, dated Aug. 24, 2012.

* cited by examiner

*Primary Examiner* — Thomas M Lithgow
(74) *Attorney, Agent, or Firm* — Moore & Van Allen PLLC (57) ABSTRACT

A mechanism levels and holds down lateral screens on a basin floor having drop pipes. Support plates fit underneath the lateral screens along their length, and bolts on the ends of these support plates can be used to level the screens. Anchor bolts are affixed to the basin floor using known techniques along and between the various screens. Hold-down bars then fit on these anchor bolts and are held by washers and nuts. Ends of these bars hold against the edges of the plates and the sides of the screens to hold them against the basin floor.

18 Claims, 13 Drawing Sheets

LEVELING HOLD-DOWN MECHANISM FOR LATERAL SCREENS

BACKGROUND

U.S. Pat. No. 5,156,738 to Maxson, which is incorporated herein by reference in its entirety, describes an underdrain system having a curved screen situated above a flat base plate. The underdrain system positions below a media bed so that liquid, usually water, exiting overflow troughs above the media bed can pass through the media.

During normal operation, water that has passed through the media bed falls into the underdrain system and into the screen, which has thin slots sized to retain particles that make up the media bed. Yet, water passing through the screen can be subsequently discharged from the underdrain system. As opposed to normal operation, a backwash mode can be used clean the media. In the backwash mode, water and air are directed upwardly through the screen and media bed in a uniform manner so that the material previously filtered out and captured by the media bed can be discharged through an overflow trough.

The underdrain system is formed of stainless steel and has its screen portion situated between two up-turned, side edge portions of its elongated flat base plate. Its screen portion is formed by helically winding and welding a metal wire to a channel base support as described in Geske U.S. Pat. No. 4,096,911, for example.

Screens and base plates that form lateral assemblies for underdrain systems can be quite large, often measuring as long as 30 feet, but they are more typically about 20 feet long. In the prior art, such lateral assemblies as described above have been formed of metal. Accordingly, these assemblies are difficult to transport and assemble due to their weight. Furthermore, where these metal assemblies are to be used with seawater or brackish water, they are subject to corrosion even when fabricated of stainless steel. In addition, because stainless steel is quite expensive, the base plates of these metal assemblies are usually relatively thin, allowing them to bow during use unless a substantial number of fixtures are provided to keep them in place and flat against the basin floor.

Figure 1A:
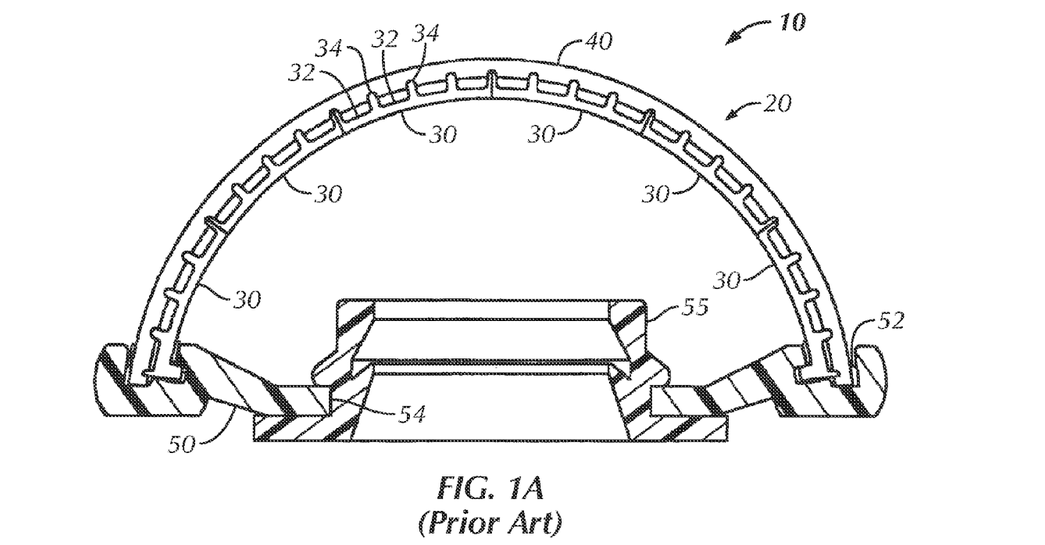
FIG. 1A is an end-sectional view of a lateral screen assembly according to the prior art.
Figure 1B:
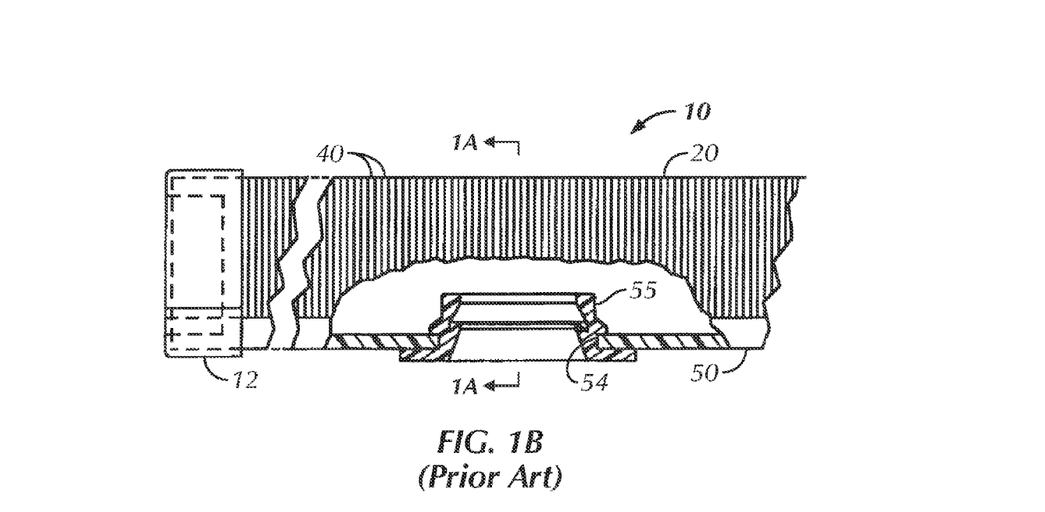
FIG. 1B is a side view of the lateral screen assembly.

To overcome some of the challenges associated with such a metal lateral assembly, another underdrain screen is disclosed in U.S. Pat. No. 5,618,426, which is incorporated herein by reference in its entirety. As shown in FIGS. 1A-1B, the lateral screen 10 has a curved screen element 20 and a rigid extruded base plate 50. The lateral screens 10 can be similar to the lateral screens of Johnson Screen's Triton® Underdrain System.

This screen 10 can be used in water treatment applications. When installed at the bottom of a water treatment basin, the lateral screen 10 collects and distributes water while directly retaining filtering media. The base plate 50 has a central opening 54 for a fitting seal 55 composed of nitrile or neoprene rubber, and the lateral screen 10 can be closed at its ends by molded plastic end caps 80. When installed in a basin, the fitting seal 55 fits onto the end of a drop pipe (not shown) passing through the floor of the basin.

The screen element 20 slides into channels 52 along the longitudinal edges of the base plate 50, which is composed of extruded polyvinylchloride (PVC). The screen element 20 is composed of PVC wire 40 (e.g., Vee-Wire®) wound around and welded to "U" shaped channel rods 30 at each intersection to the channel ribs 34. (VEE-WIRE is a registered U.S. trademark of Weatherford/Lamb, Inc.) The screen element 20 can also be made of other materials, such as stainless steel or as required by the process in which the screen will be used.

On the screen element 20, the wires 40 and ribs 30 define small openings for the retention of media and collection of filtered liquid. During fluid flow, the small openings cooperate with each other to form a flow distribution system for uniformly controlling the flow of water and air passing into and out of the screen element 20.

In some implementation, it is desirable for the underdrain screen 10 to have an extended length. However, such a longer screen 10 needs additional leveling and hold down capability due to higher variations in the flatness of the basin floor in the larger basins the longer screens 10 will be installed. Typically, this will be for larger water treatment or desalination plants.

In smaller installations, the variation on the floor height of the basin is typically specified to be within ¼". This has allowed the underdrain screens 10 to be successfully installed and used without the need for sophisticated leveling. For larger basins, however, it can be difficult to maintain the ¼" tolerance in flatness. In some cases, shims or other spacer systems must be placed under the underdrain screens 10 by installers.

Stainless steel underdrain screens can have a leveling screw welded to the side of the screens to allow them to be leveled for larger basins. The tops of these leveling screws are held down by a channel, which both holds the underdrain screens in place and prevents the leveling screws from moving during operation. This form of leveling and hold down is not available for screens made of plastic, such as PVC.

Figure 1C:
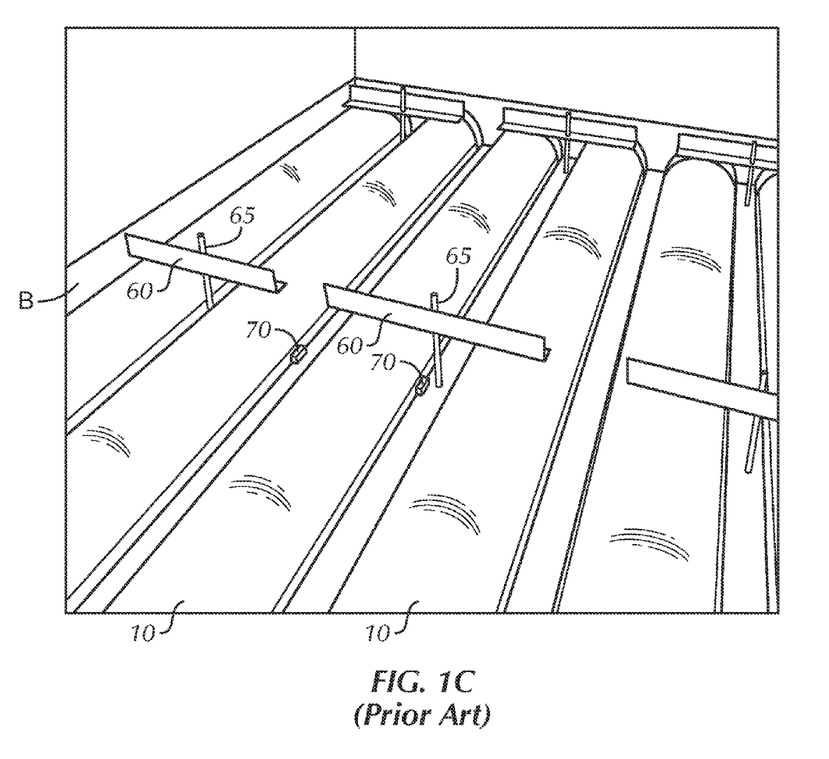
FIG. 1C is a perspective view of lateral screens installed in a basin with prior art hold down bars.

Instead, as shown in FIG. 1C, the common way of leveling and retaining underdrain lateral screens 10 of plastic in a basin B uses shims 70 and upper hold-down bars 60. Operators fit the shims 70 underneath the screens 10 where needed along their length to level them. To hold down the screens 10, operators install the angle hold-down bars 60 over the top of the lateral screens 10. These bars 60 affix by anchor bolts 65 in the basin floor and run perpendicular to the length of the lateral screens 10.

The subject matter of the present disclosure is directed to overcoming, or at least reducing the effects of, one or more of the problems set forth above.

SUMMARY

A leveling hold-down mechanism is used with lateral screens on the floor of a basin having drop pipes. The lateral screens are composed of plastic, such as PVC, or other non-metallic material. The mechanism includes inner and outer assemblies. The outer assembly supports the lateral screens at the ends of the adjacent rows of lateral screens situated on the basin floor. The inner assemblies support between the adjacent lateral screens laying side-by-side on the basin floor.

The outer assembly has support plates with two nuts affixed on an outer edge for adjustment bolts and one nut affixed on an inner edge for an adjustment bolt. These support plates fit underneath the lateral screen along its length, and outer hold-down bars fit onto anchor bolts affixed to the basin floor using known techniques. The edges of these bars hold against the outer edge of the lateral screen's base.

The inner assembly also has support plates, but these have one nut alternatingly affixed on each edge of the plates for adjustment bolts. These support plates fit underneath a lateral screen along its length when positioned next to another lateral screen. Inner hold-down bars fit onto anchor bolts affixed to the basin floor using known techniques. The edges of these bars hold against the outer edges of the lateral screens' bases. The mechanism allows for individual leveling of the lateral screens at closer intervals, which results in easier (i.e., less costly) and more precise installation.

The foregoing summary is not intended to summarize each potential embodiment or every aspect of the present disclosure.

DETAILED DESCRIPTION

Figure 2A:
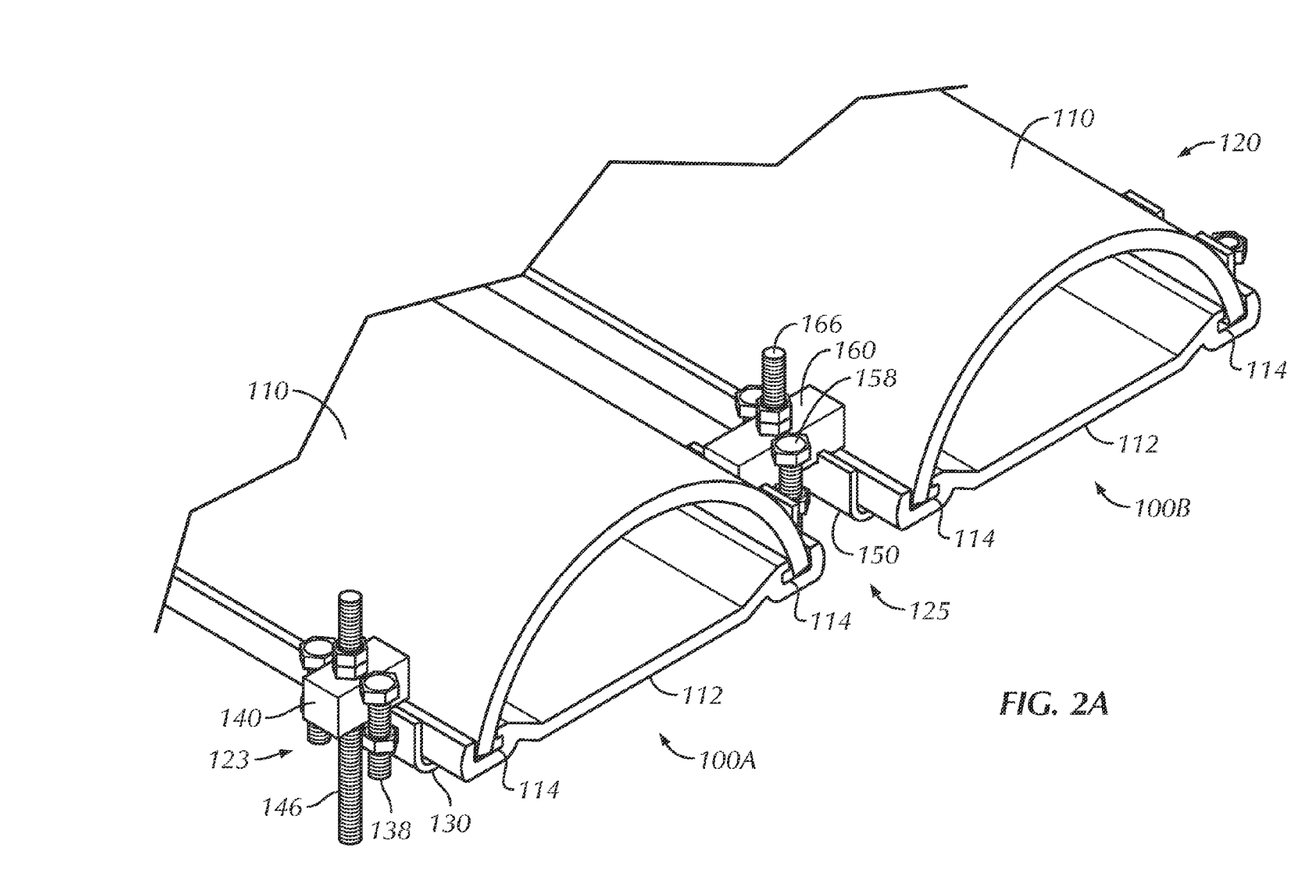
FIG. 2A-2B are perspective and end views of lateral screens having a leveling hold-down mechanism according to certain teachings of the present disclosure.
Figure 2B:
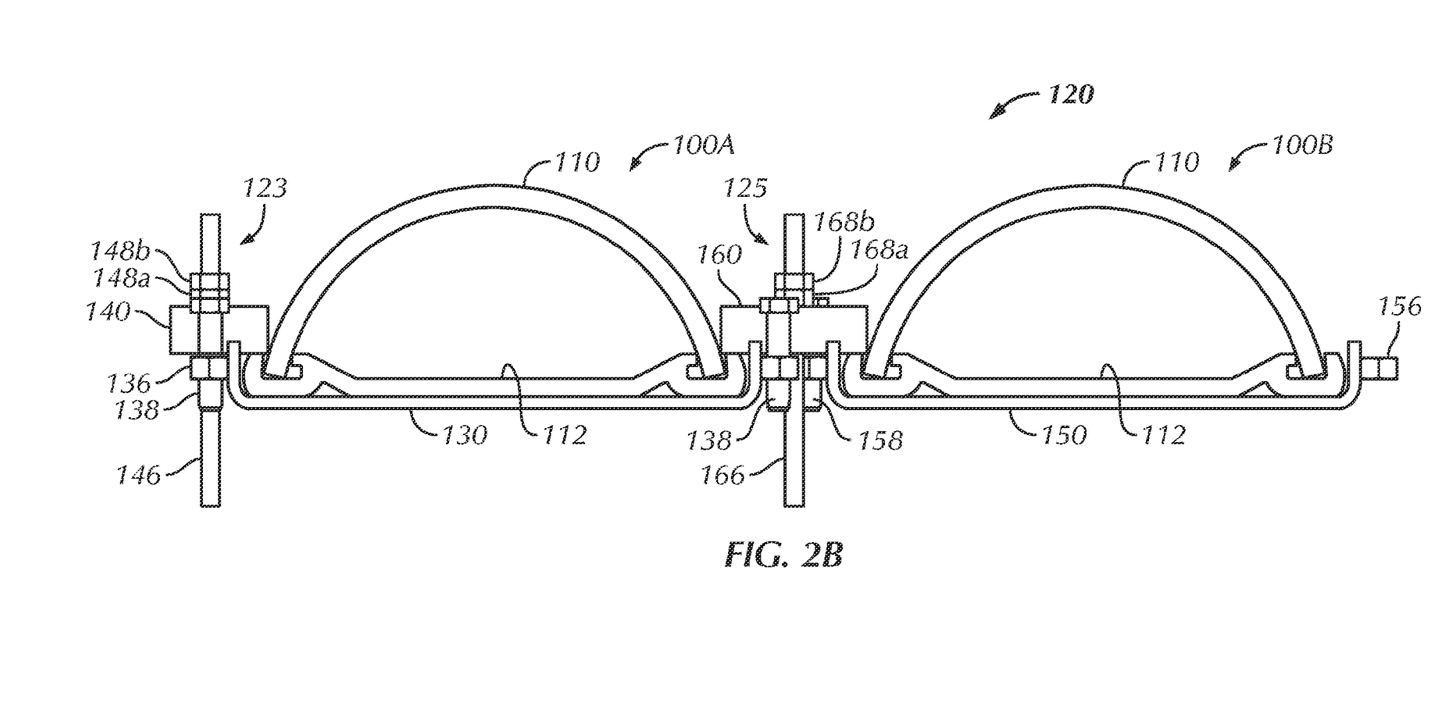

FIGS. 2A-2B show perspective and end views of lateral screens 100A-B having a leveling hold-down mechanism 120 according to certain teachings of the present disclosure. The mechanism 120 helps maintain the lateral screens 100A-B in a level state and holds them in place during normal operation (downflow) and backwash (upflow) in an underdrain system. The lateral screens 100A-B can be similar to the lateral screens of Johnson Screen's Triton® Underdrain System.

In use, the lateral screens 100A-B collect and distribute water while directly retaining filtering media. To do this, each lateral screen 100 has a screen element 110 that slides into channels 114 along the longitudinal edges 116 of a base plate 112. Although not shown, the screen element 110 is composed of PVC Vee-Wire® wound around and welded to "U" shaped channel rods as described previously. In addition, the base plate 112 is composed of extruded PVC and has a central opening (not shown) for affixing on a drop pipe with a seal or the like. The screen element 110 can also be made of other materials, such as stainless steel or as required by the process in which the screen will be used.

The mechanism 120 uses two different hold-down assemblies 123/125 for an installation depending on the location of the lateral screens 100A-B in a basin. An outer hold-down assembly 123 has an outer leveling plate 130 with leveling bolts 138 and has an outer hold-down bar 140 with an anchor bolt 146. Because the screens 100A-B are normally installed side-by-side on the basin floor, the outer hold-down assembly 123 is used for the end or last screen 100A on either end of the basin as described in more detail below. An inner hold-down assembly 125 has an inner leveling plate 150 with leveling bolts 158 and has an outer hold-down bar 160 with an anchor bolt 166. This inner hold-down assembly 125 is used between lateral screens 100A-B on the basin floor as described in more detail below.

The plates 130/150, bars 140/160, bolts 138/158, and the like are separate components from the lateral screens 100A-B, rather than being welded/attached to them. This allows for easier adjustment and placement of the screens 100A-B during installation. It also allows for more accurate leveling of the plastic lateral screens 100A-B, which are typically leveled using shims in the less reliable manner of the prior art.

As generally shown in FIGS. 2A-2B and described in more detail below, the leveling plates 130/150 support the bottom of the lateral screens 100A-B at appropriate intervals along their length. The spacing between plates 130/150 along the length of a screen 100 is dependent on the weight of the water and media in the basin and the expected hydraulic forces encountered during backwash. Leveling bolts 138/158 on the sides of the plates 130/150 can be used to raise the plates 130/150 and the supported section of the screens 100A-B to effectively level the screens 100A-B.

The threaded anchor bolts 146/166 are placed next to or between the screens 100A-B depending on their location in the basin, and hold-down bars 140/160 are placed on the threaded anchor bolts 146/166. A nut/washer arrangement then clamps the bars 140/160 to the screens 100A-B and the plates 130/150. The bars 140/160 are sized and positioned in such a way as to restrict any turning motion of the adjacent leveling bolts 138/158.

The components of the mechanism 120 can be made of a variety of materials so that any special alloys can be used when required in desalination plants or other corrosive environments. The components of the mechanism 120 can also be standardized and can be used in many installations without modification. In the end, the mechanism 120 enables the plastic lateral screens 100A-B to be used in applications where they could not be used previously because the plastic lateral screens 100AB could not be adequately held down and leveled with prior art systems.

Figure 3A:
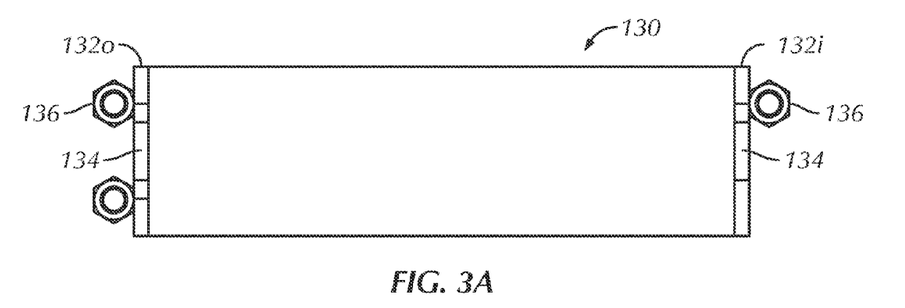
FIGS. 3A-3B show top and side views of an outer leveling plate of the disclosed mechanism.
Figure 3B:
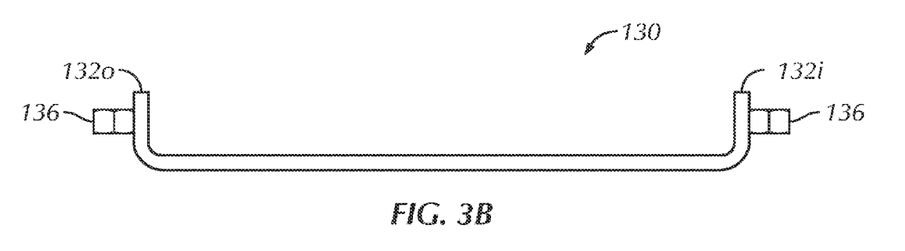

As shown in FIGS. 3A-3B, the outer leveling plate 130 has upward extending sides or edges 132o-i defining notches 134 on top. A number of nuts 136 weld to the sides 132o-i, although other ways of including threading openings in the sides 132o-i could be used. In particular, the outer side 132o has two nuts 136 on either side of the notch 134, while the inner side 132i has one nut 136 on one side of the notch 134. As shown previously in FIGS. 2A-2B, adjustment bolts 138 install in these side nuts 136 for adjusting the level of the plate 130 when disposed on a basin floor as described below.

Figure 4A:
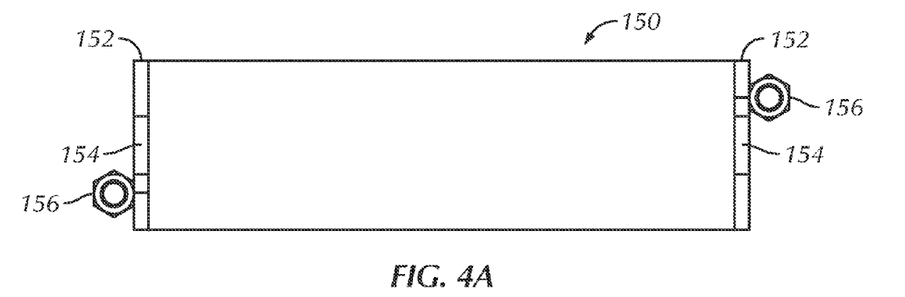
FIGS. 4A-4B show top and side views of an inner leveling plate of the disclosed mechanism.
Figure 4B:
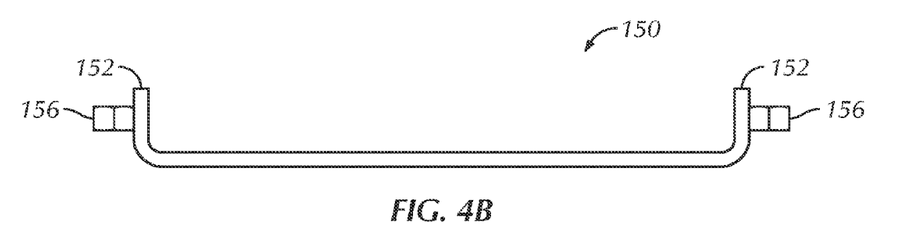
Figure 5A:
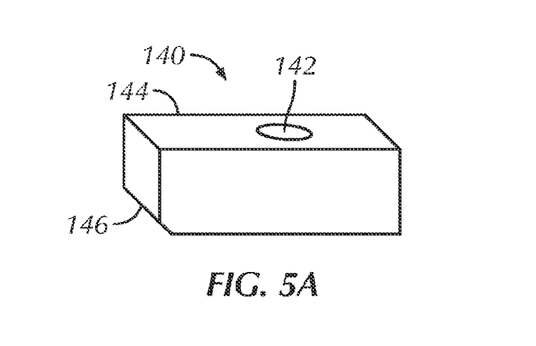
FIGS. 5A-5D are perspective, top, end, and side views of an outer hold-down bar.
Figure 5B:
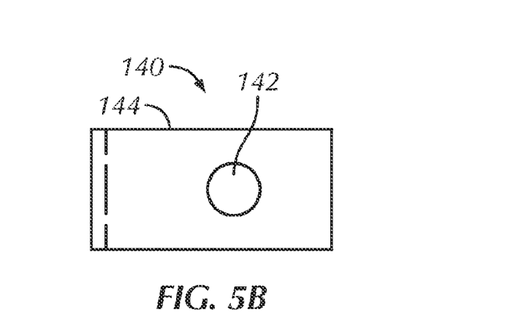
Figure 5C:
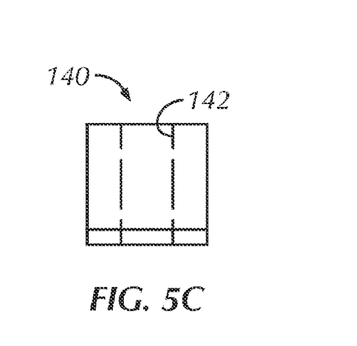
Figure 5D:
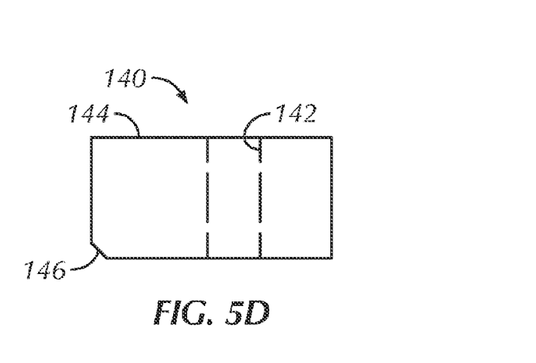
Figure 6A:
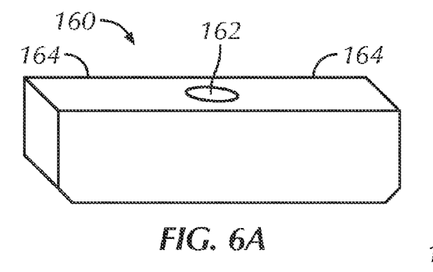
FIGS. 6A-6D are perspective, top, end, and side views of an inner hold-down bar.
Figure 6B:
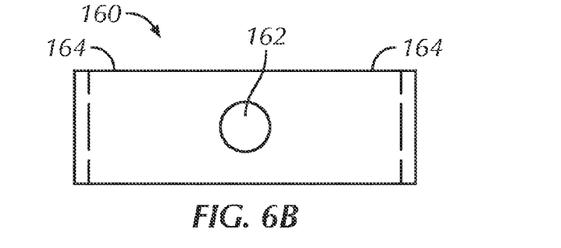
Figure 6C:
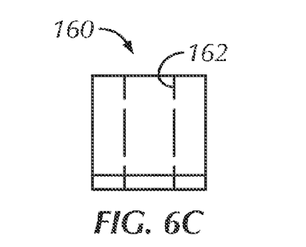
Figure 6D:
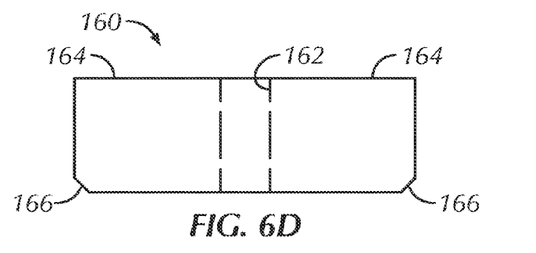

As shown in FIGS. 4A-4B, the inner leveling plate 150 also has upward extending sides or edges 152o-i defining notches 154 on top. A number of nuts 156 weld to the sides 152o-i, although other ways of including threading openings in the sides 152o-i could be used. In particular, the outer side 152o has one nut 156 on one side of the notch 154, while the inner side 152i has one nut 156 on the opposite side of the notch 154. As shown previously in FIGS. 2A-2B, adjustment bolts 158 install in the side nuts 156 for adjusting the level of the plate 150 when disposed on a basin floor as described below.

As shown in FIGS. 5A-5D, the outer hold-down bar 140 has a through-hole 142 that is off center and toward an outer edge. An extended end 144 of the bar 140 can be used for holding down an edge 116 of a lateral screen 100 as shown previously in FIGS. 2A-2B, for example. The inner edge of the bar 140 can have a chamfer 146 so as not to damage the screen element 110.

As shown in FIGS. 6A-6D, the inner hold-down bar 160 has a through-hole 162 defined in the center. Extended ends 164 on either side of the hole 162 can be used for holding down edges 116 of adjacent lateral screens 100A-B as shown previously in FIGS. 2A-2B, for example. Both edges of the bar 160 can have a chamfer 166 so as not to damage the screen elements 110.

Figure 7A:
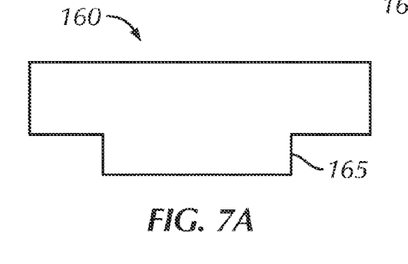
FIGS. 7A-7B show side views of alternate hold-down bars.
Figure 7B:
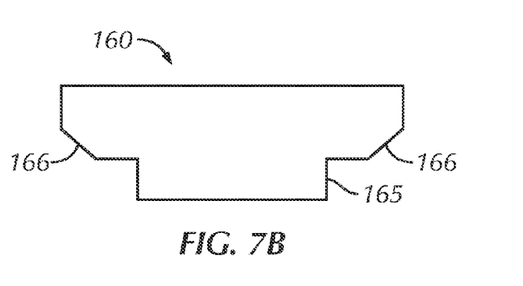

In some other variations shown in FIGS. 7A-7B, the inner hold-down bar 160 can have a central rim to center it when installed in the assembly between the adjacent support plates. Also, the outside edges of the bar 160 can be tapered as in FIG. 7B to avoid or enhance contact with the screen (not shown).

With an understanding of the components of the leveling hold-down mechanism 120, discussion now turns to steps for installing lateral screens 100A-B with the mechanism 120 in a basin. Initially, operators install the leveling bolts 138/158 into the hold-down plates 130/150 so that distal ends of the bolts 138/158 are flush with the bottom surfaces of the plates 130/150.

Figure 8A:
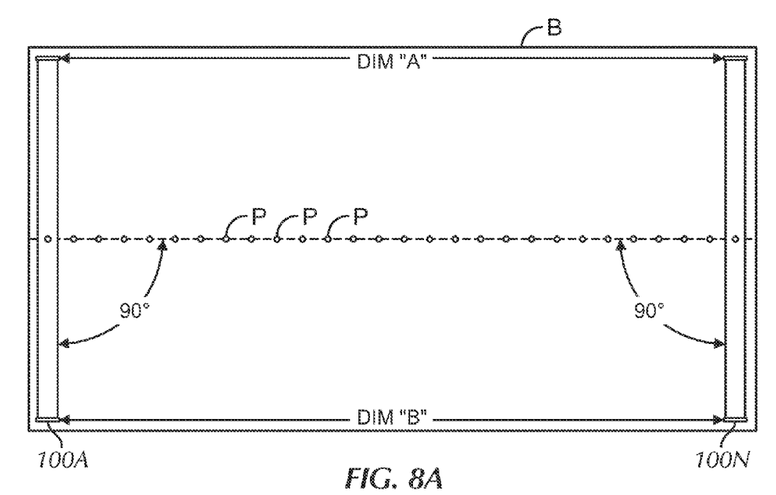
FIGS. 8A-8B shows a plan view of a basin having drop pipes and arrangements of lateral screens during assembly procedures.

As shown in FIG. 8A, operators place the first and last lateral screens 100A and 100N onto the floor of the basin B at opposing ends. The bases 112 of the screens 100 affix to the ends of the drop pipes P using known procedures and attachments not detailed herein. The screens 100A and 100N are positioned so that they are perpendicular to the arranged line of drop pipes P that pass through the floor of the basin B. Once perpendicular to the drop pipes P, operators verify that there is no interference with the basin's walls on either lateral screen 100A and 100N. Next, operators measure between the two screens 100A and 100N on each end to verify that the ends are separated by an equal distance (i.e., DIM "A" should equal DIM "B").

Figure 8B:
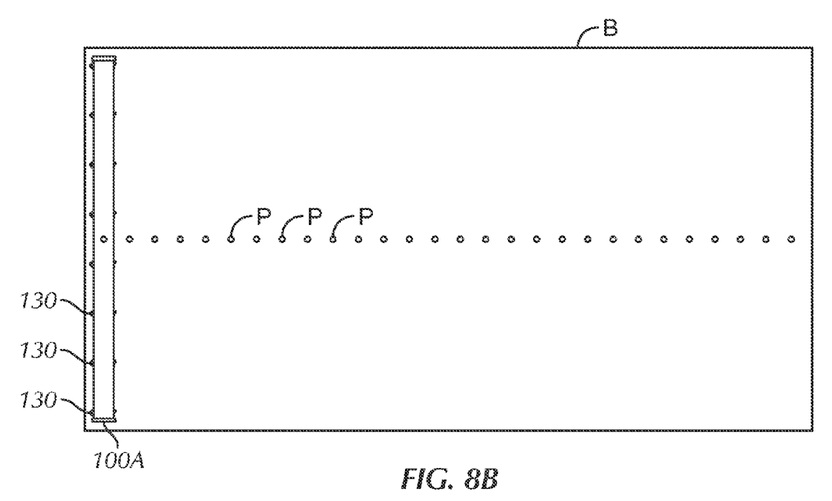

Next, as shown in FIG. 8B, operators install the outer hold-down plates 130 with its flush adjustment bolts 138 underneath the first lateral screen 100A on the end of the basin B. Working down the length of the first lateral screen 100A, operators mark out the outer hole locations for the anchor bolts 146. While marking the locations, operators verify that plates 130 are perpendicular to the lateral screen 100A.

Figure 9A:
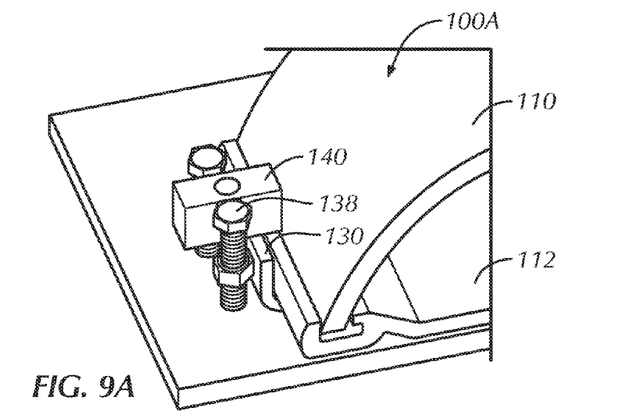
FIGS. 9A-9C show steps for assembling the outer hold-down plate and bar on a lateral screen.

As shown in FIG. 9A, operators use the outer hold-down bar 140 as a guide to mark the locations of the holes to be drilled for the anchor bolts (146). For proper placement, the outer hold-down bar 140 is preferably placed at least past the halfway point on the edge 116 of the screen's base plate 112, but not in contact with the screen element 110. As expected, the chamfered edge of the hold-down bar 140 fits at the base plate's edge 116.

Once the locations are marked, operators drill holes in the basin's concrete floor according to known procedures. The anchor holes are vacuumed and cleaned of debris after drilling, and operators install the anchor bolts (146) according to known procedures while using the hold-down bar 140 as an alignment guide. Depending on the type of anchor bolts 146 used, the various anchor holes for one or more of the screen elements 110 can be drilled in advance of, during, or after setting down the screen assembly's components on the basin floor. Pre-drilling of the holes may be useful when the anchor bolts 146 are chemically set. Yet, each set of anchor holes can be drilled and bolts 146 set separately for each screen element 110 as operators continue installing along the basin floor for other types of anchors.

Figure 9B:
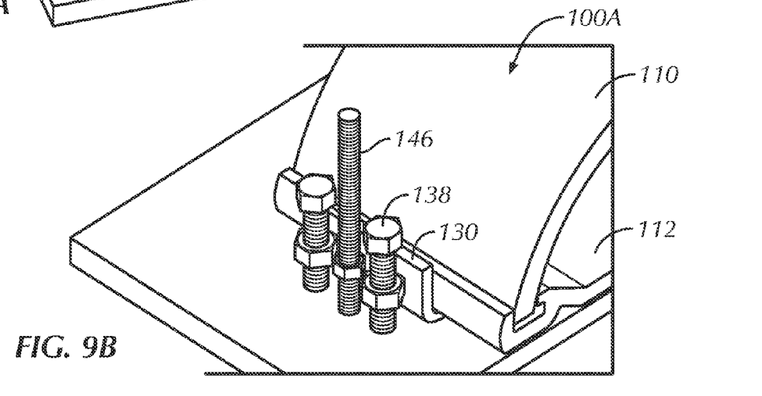

Once the anchor bolts 146 have been installed as shown in FIG. 9B, operators start to level the lateral screen 100A to within a predetermined tolerance using the leveling bolts 138 located on the sides of the hold-down plates 130. In one implementation, the lateral screen 100A is leveled within a tolerance of ±0.25" down the entire length of the screen 100A. Therefore, operators preferably use a surveyor's level. The intent is to level each lateral screen 100 to within a specified tolerance rather than level one screen 100 to another. However, the leveling system can be used to achieve this goal as well.

Figure 9C:
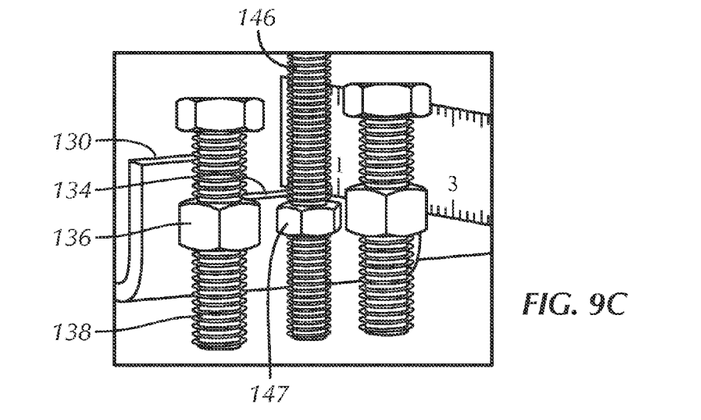

As shown in FIG. 9C, operators then install hex nuts 147 on the anchor bolts 146 until they are flush with the notches 134 formed in the hold-down plates 130. At this point, operators then place the outer hold-down bars 140 onto threaded anchor bolts 146 and install washers 149 and nuts 148a-b on top of the bars 140. The lower nuts 148a are hand tightened at first so the leveling bolts 138 can be adjusted slightly to allow the hold-down bars 140 to fit tightly between the heads of the bolts 138. At this point, the nuts 148a can be tightened according to the requirements of the anchor system used. For example, if a mechanical (wedge/expansion) style anchor bolt 146 is used, the nuts 148a can be tightened to a specified torque. If an adhesive style anchor system is used, the adhesive for the anchor bolt 146 should be cured before tightening the nuts 148a.

Figure 10A:
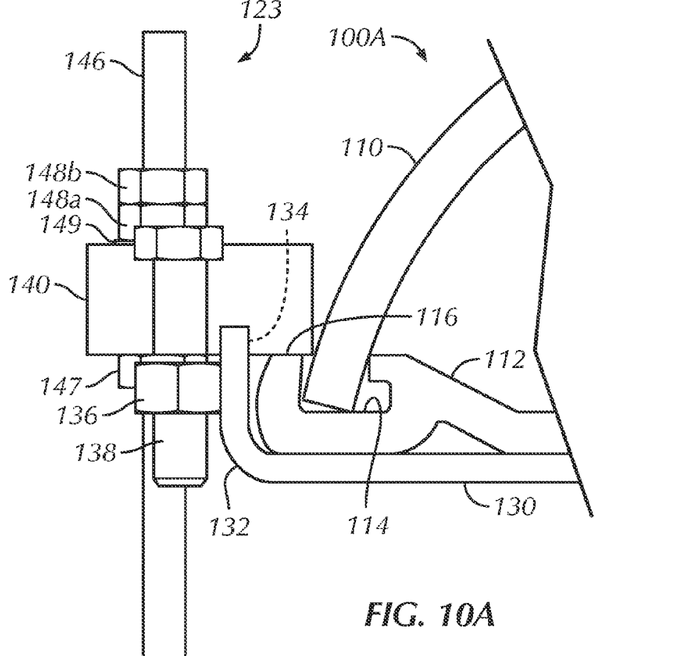
FIGS. 10A-10B show side and plan views of the outer hold-down plate and bar installed on a lateral screen.
Figure 10B:
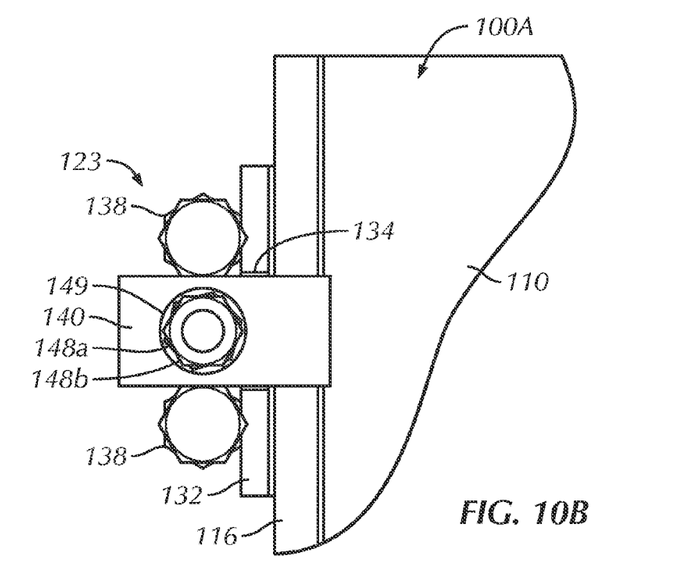

Once the hold-down bar 140 is torqued to desired level, operators install a second hex nut 148b onto the threaded anchor bolt 146 and lock them against the torque hex nuts 148a. In the end, the outer hold-down assembly 123 holds the outside longitudinal edge 116 of the first lateral screen 100A as shown in FIGS. 10A-10B. Locking nuts or other methods can be used to prevent these nuts 148a-b from loosening during service.

Figure 11:
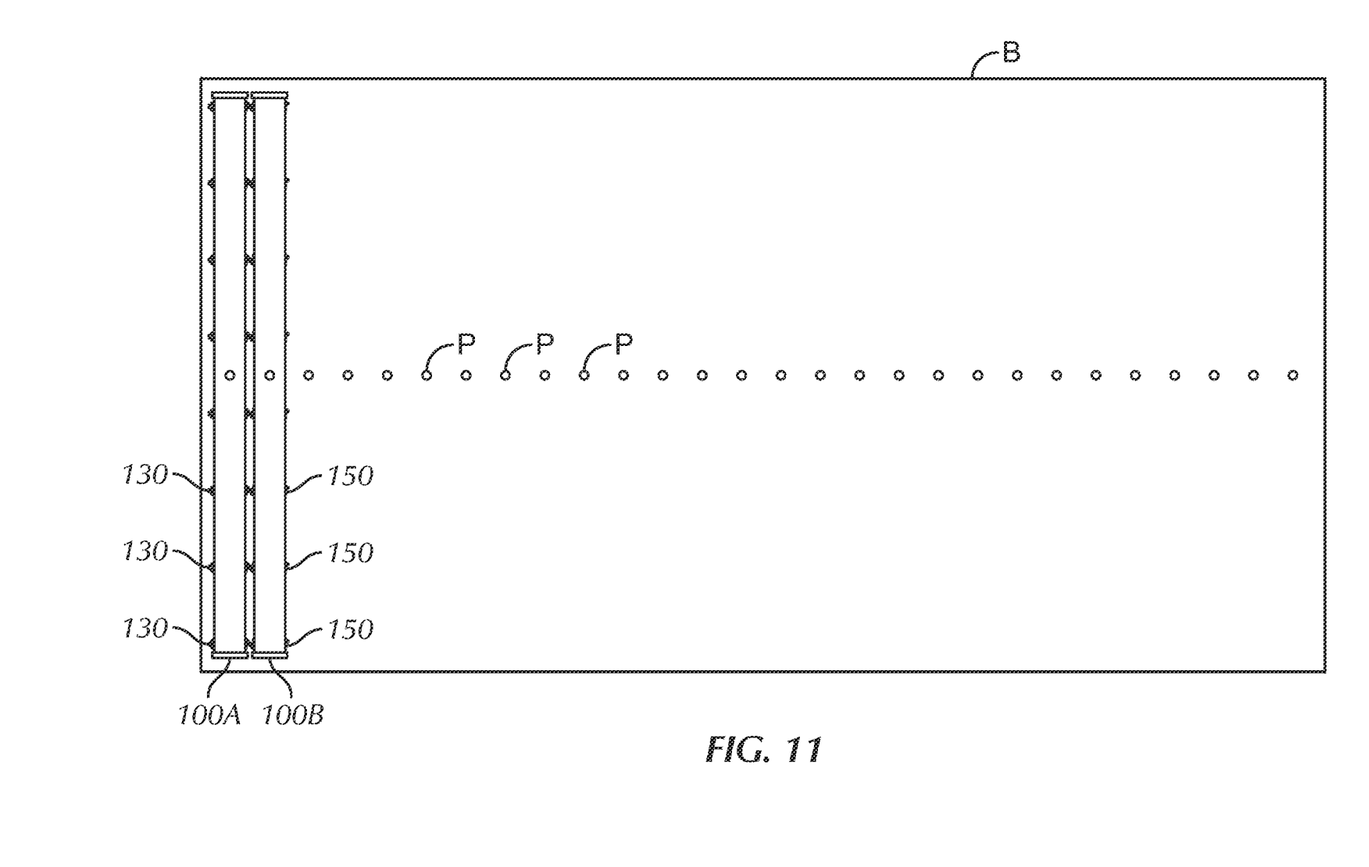
FIG. 11 shows a plan view of the basin having a subsequent arrangement of lateral screens during assembly procedures.

Once the first lateral screen 100A has been installed as above, operators then proceed with installing the next lateral screen 100B as shown in FIG. 11. Operators place the next lateral screen 100B in the basin B next to the installed screen 100A. For this second screen 100B, operators install the inner hold-down plates 150 in place underneath the screen 100B. Then, operators use the inner hold-down bars 160 as spacers between the two screens 100A-100B. Again, the inner hold-down bars 160 should not be in contact with the screen element 110, but should also not be located more than halfway past the center of the edge 116 of the base plates 112.

During these steps, operators square up the inner hold-down bars 160 inside the notches of the adjoining hold-down plates 130/150. While doing this, operators also square up the heads of the leveling bolts 138/158 against the inner hold-down bars 160. As before, operators use the inner hold-down bar 160 as a guide to mark the hole locations for drilling into the basin floor. Once marked, operators drill the holes in the concrete, clean the holes of debris, and install the anchor bolts 166 using the hold-down bars 160 as alignment guides. The drilling of the holes has also been described previously where the holes are laid out and drilled first (before the screens are installed). Either process will work, and what steps are done are at the discretion of the installers. When chemical anchors are used, which is often the case, the installers drill holes and install all of the anchors first so they can cure the required curing time.

Figure 12A:
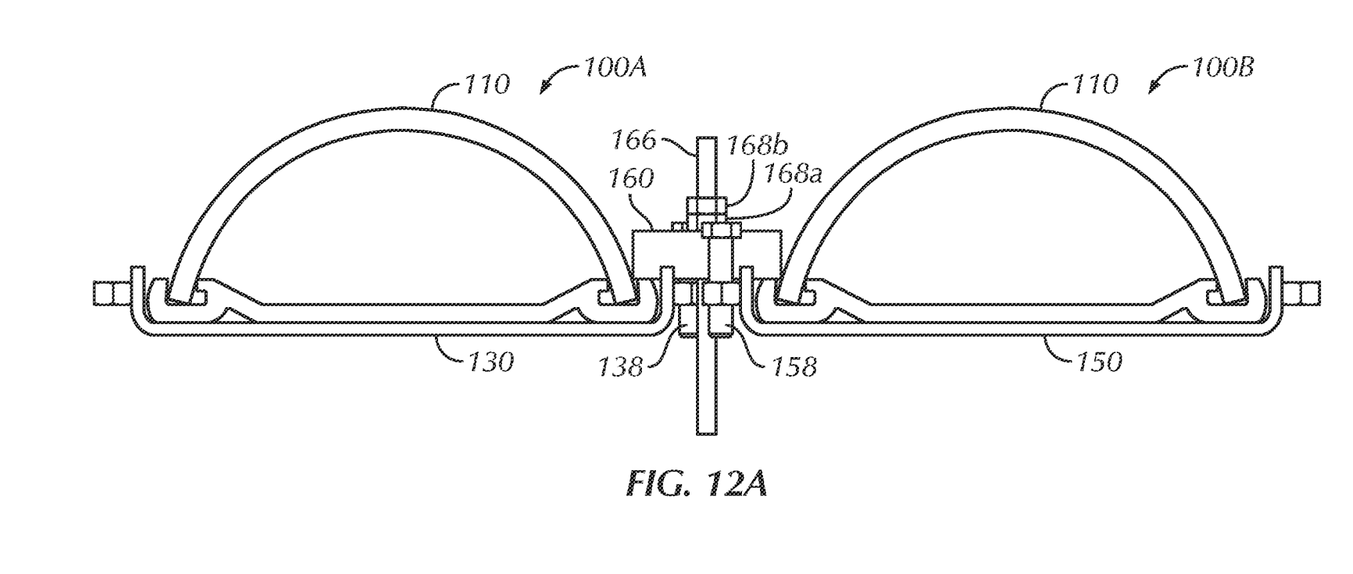
FIGS. 12A-12B show side and plan views of the inner hold-down plate and bar installed on lateral screens.
Figure 12B:
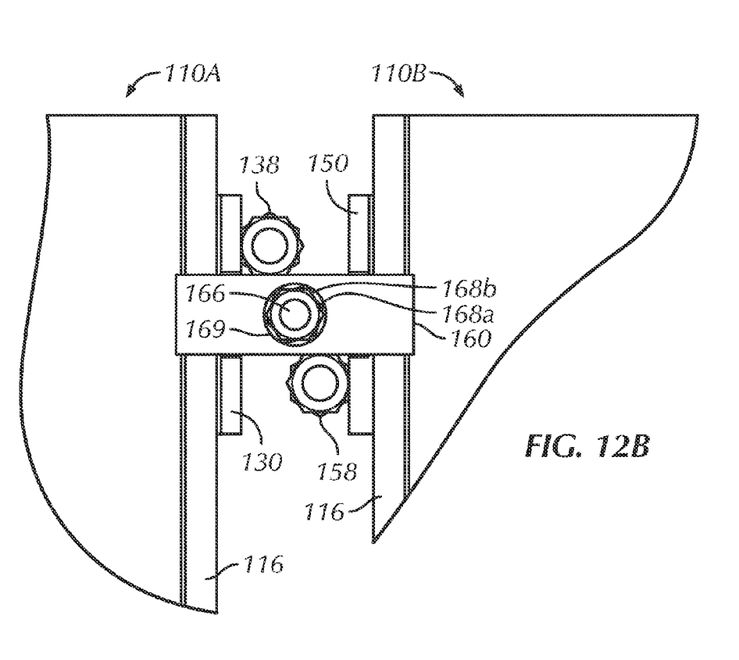

Once the anchor bolts 166 have been installed, operators start to level the screen 100B to within the predetermined tolerance using the leveling bolts 158 located on the sides of the hold-down plates 150 as shown in FIGS. 12A-12B. After the screen 100B is level, operators begin installing the inner hold-down bars 160 onto the anchor bolts 166. The leveling bolts 138/158 may need to be adjusted slightly to allow the hold-down bars 160 to fit tightly between the bolt heads. The inner hold-down bars 160 are squared inside the notches of the hold-down plates 130/150 as are the leveling bolt heads against the inner hold-down bars 160.

Once squared up, operators place a washer 169 and hex nut 168a onto the anchor bolts 166, and operators tighten the hex nut 168a onto inner hold-down bar 160. Again, this tightening uses prescribed procedures. Finally, the second hex nuts 148b install onto the anchor bolts 166 and lock against the torqued hex nuts 148a. In the end, the inner hold-down assembly 125 holds the lateral screens 100A-B as shown in FIGS. 12A-12B.

Similar procedures are then repeated along the length of the basin B of FIGS. 8A-8B until the required number of lateral screens 100A through 100N have been installed on the drop pipes P and supported by the leveling hold-down mechanism 120 of the present disclosure.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A leveling hold-down apparatus for lateral screens on a basin floor, the apparatus comprising:
    a plurality of plates having opposing ends, each of the opposing ends having at least one threaded opening, the plates fitting between the lateral screens and a basin floor with the threaded openings exposed along longitudinal sides of the lateral screens;
    a plurality of adjustment bolts threaded in the threaded openings of the plates and adjusting level of the plates relative to the basin floor; and
    a plurality of bars disposing between adjoining ends of the plates on adjacent ones of the lateral screens, the bars engaging the adjoining ends of the plates and the longitudinal sides of the adjacent ones of the lateral screens, the bars anchoring to the basin floor.

2. The apparatus of claim 1, wherein the plates comprise first plates each having inner and outer ends for the opposing ends, each of the first plates having two of the threaded openings on the outer end and having one of the threaded openings on the inner end.

3. The apparatus of claim 2, wherein the bars comprise first bars each defining an opening fitting on an anchor affixed to the basin floor, an end of the first bar engaging the end of one of the first plates and the longitudinal side of one of the lateral screens.

4. The apparatus of claim 3, wherein the end of each first bar disposes in a cutaway on the outer end of the first plate between the two threaded openings.

5. The apparatus of claim 1, wherein the plates comprise second plates each having a first of the threaded openings on one of the ends and having a second of the threaded openings on the other end, the first and second threaded openings disposed on opposites sides of an axis of the second plate.

6. The apparatus of claim 5, wherein the bars comprise second bars each defining an opening fitting on an anchor affixed to the basin floor, opposing ends of the second bar engaging the ends of the adjoining plates and the longitudinal sides of the adjacent lateral screens.

7. The apparatus of claim 6, wherein the end of each second bar disposes in cutaways on the ends of the second plates between the threaded openings.

8. The apparatus of claim 1, wherein each of the plates comprises a bottom having upturned rims on the opposing ends of the bottom.

9. The apparatus of claim 8, wherein the threaded openings comprises nuts affixed to the upturned rims.

10. An underdrain system for a basin floor, comprising:
    a plurality of lateral screens disposing parallel to one another on the basin floor;
    a plurality of plates having opposing ends, each of the opposing ends having at least one threaded opening, the plates fitting between the lateral screens and the basin floor with the threaded openings exposed along longitudinal sides of the lateral screens;
    a plurality of adjustment bolts threaded in the threaded openings of the plates and adjusting level of the plates relative to the basin floor; and
    a plurality of bars disposing between adjoining ends of the plates on adjacent ones of the lateral screens, the bars engaging the adjoining ends of the plates and the longitudinal sides of the adjacent ones of the lateral screens, the bars anchoring to the basin floor.

11. The system of claim 10, wherein the plates comprise first plates each having inner and outer ends for the opposing ends, each of the first plates having two of the threaded openings on the outer end and having one of the threaded openings on the inner end.

12. The system of claim 11, wherein the bars comprise first bars each defining an opening fitting on an anchor affixed to the basin floor, an end of the first bar engaging the end of one of the first plates and the longitudinal side of one of the lateral screens.

13. The system of claim 12, wherein the end of each first bar disposes in a cutaway on the outer end of the first plate between the two threaded openings.

14. The system of claim 10, wherein the plates comprise second plates each having a first of the threaded openings on one of the ends and having a second of the threaded openings on the other end, the first and second threaded openings disposed on opposites sides of an axis of the second plate.

15. The system of claim 14, wherein the bars comprise second bars each defining an opening fitting on an anchor affixed to the basin floor, opposing ends of the second bar engaging the ends of the adjoining plates and the longitudinal sides of the adjacent lateral screens.

16. The system of claim 15, wherein the end of each second bar disposes in cutaways on the ends of the second plates between the threaded openings.

17. The system of claim 10, wherein each of the plates comprises a bottom having upturned rims on the opposing ends of the bottom.

18. The system of claim 17, wherein the threaded openings comprises nuts affixed to the upturned rims.

* * * * *